INVENTORS
RICHARD C. DITZLER
NORMAN BURSTEIN
BY

ATTORNEY

April 11, 1967 R. C. DITZLER ETAL 3,313,917
DOORLESS INFRARED OVEN
Filed Nov. 21, 1963 2 Sheets-Sheet 2

INVENTORS
RICHARD C. DITZLER
NORMAN BURSTEIN
BY
Millman and Jacobs
ATTORNEY

United States Patent Office 3,313,917
Patented Apr. 11, 1967

3,313,917
DOORLESS INFRARED OVEN
Richard C. Ditzler, Riverton, and Norman Burstein, Cherry Hill, N.J., assignors to Litton Precision Products, Inc., Cleveland, Ohio, a corporation of Delaware
Filed Nov. 21, 1963, Ser. No. 325,230
11 Claims. (Cl. 219—400)

This invention relates to ovens and particularly to infrared ovens that are compact and convenient to use.

This invention has particular application for use in preparing food in restaurants and the like. Infrared cooking has been found to be useful for its fast operation, especially in connection with pre-cooked frozen foods. In order to use a high temperature oven for cooking foods such as frozen pre-cooked foods, problems arise with respect to achieving a compact and economical construction and at the same time making the oven large enough to receive one or more cooking pans. In addition, it is important for the operator to be able to gain quick access to the oven and to manipulate the handles of the pans easily and without danger of burns to the operator. For this reason, it is also desirable that the outer surfaces of the oven be maintained at safe and comfortable temperatures. The quick access to the oven should also be under such conditions that blasts of heat and food vapors do not come from the oven when the pans are inserted or removed.

Accordingly, it is among the objects of this invention to provide a new and improved infrared oven.

Another object is to provide a new and improved infrared oven that is compact and convenient and safe in use.

Another object is to provide a new and improved infrared oven whose outer surfaces are at moderate temperatures during use and which is convenient and readily accessible for insertion and removal of cooking pans.

Another object is to provide a new and improved infrared oven that is economical in construction.

In accordance with an embodiment of this invention, an infrared oven unit is mounted within an air duct enclosure. Within the oven unit an oven chamber is formed with heated quartz plates as the upper and lower walls thereof. The chamber is closed on all sides except for a front access passage extending substantially the full length of the chamber which is left uncovered, and the chamber is surrounded by suitable insulation. The air duct enclosure has walls spaced from the outer walls of the oven unit and completely encloses it except at the front of the oven where an opening is provided corresponding substantially in size and location to the opening into the oven chamber. An exhaust fan is provided at the rear of the enclosure, and the spacing between the oven walls and the enclosure walls is such as to provide air ducts around all of the walls of the oven unit and including an air duct passing in front of the oven unit between the outer front wall thereof and the front wall of the enclosure. Thereby, an air curtain is established in front of the oven unit which draws off heat and vapors from the oven chamber. The air flow around the oven walls exhausts the heat radiating from those walls. Thereby, the outer walls of the air duct enclosure are maintained at moderate and safe temperatures, and heat does not radiate out of the opening in the front face of the enclosure. An operator inserts pans into the oven chamber with the handles thereof projecting out through the front opening thereof and through the front opening of the air duct enclosure. The pan handles do not become hot during cooking, and the insertion and removal thereof is performed quickly and safely. Moreover, any odors and spattering of grease coming from the foods cooking in the pans within the oven chamber are removed by the air curtain and exhausted in a direction away from the operator.

The foregoing and other objects of this invention, the features thereof as well as the invention itself, may be more fully understood from the following description when read together with the accompanying drawing, in which.

In the drawing, corresponding parts are referenced throughout by similar numerals.

Figure 1:
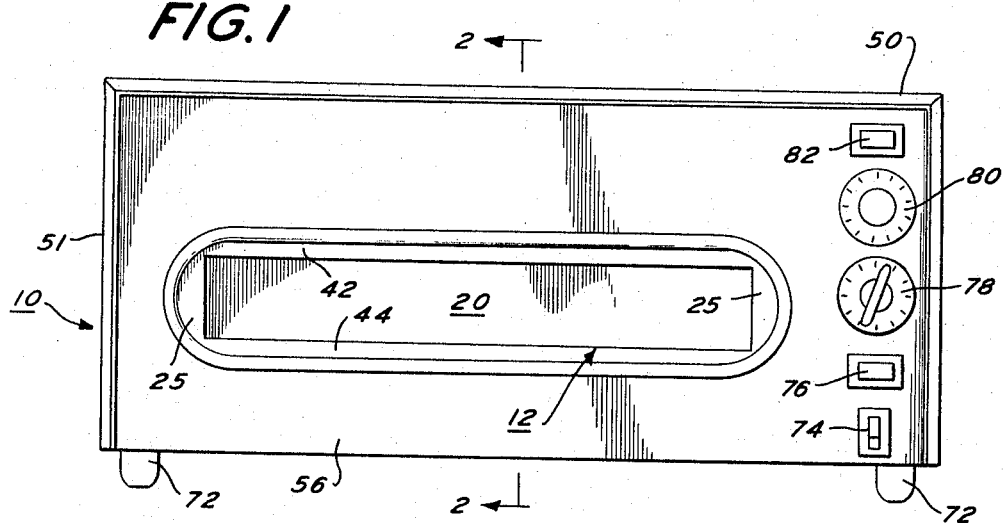
FIG. 1 is a front elevation of an infrared oven embodying this invention.

The infrared oven in FIGS. 1–4 includes an outer sheet metal enclosure 10 and an inner oven unit 12. The oven unit 12 includes a sheet metal housing having a flat wall 14 and 16 at top and bottom, and side and rear wall panels 15, 17, and 19; the latter are formed by a member 18 that is bent in a U-shape, and whose open ends 21 project beyond the top and bottom walls 14 and 16.

An oven chamber 20 is formed within the housing walls, and side and rear walls 22 and 23 are fabricated from a sheet metal member 24 bent in a U-shape and spaced parallel to the housing wall member 18. The member 24 has bent side edges to form flanges that are used for structural strength, and for attachment purposes. The front edges 25 of the member 24 are bent at right angles and flanged to fill the space between it and the housing member 18 and are thereby attached to that member 18. Two rectangular quartz plates 28 and 30 form the top and bottom walls, respectively, of the oven chamber 20. The rear ends of these rectangular plates 28 and 30 are mounted against the top and bottom edges of the wall member 24.

Mounted against the outer surfaces of the quartz plates 28 and 30 are two electrical heater units 32 and 34, respectively. These heater units include rectangular metal channel members having rows of projecting circular tongues 36 fastened thereto, and suitable wire heater coils 38 that are strung between the spaced members 36 along successive rows thereof and secured to terminals 40 at their ends. The terminals serve as connectors for wires to a power source. The heater units 32 and 34 are bolted together with the quartz plates 28 and 30 and the chamber wall member 22 sandwiched therebetween.

The front of the oven unit 12 is covered by two spaced rectangular members 42 and 44 that extend the full width of the front face of the oven unit between the side walls 15 and 17 thereof, to which they are fastened by suitable flanges. The top and bottom edges of the members 42 and 44 are bent to form flanges; the outer flanges are attached to the top and bottom wall members 14 and 16, and the inner flanges are flush with, and a continuation of, the inner surfaces of the quartz plates 28 and 30.

The space between the heating units 32 and 34 and chamber wall 22 and the housing walls of the oven unit is insulated by a suitable material such as a high temperature fiberglass to retard loss of heat through the walls of the oven unit.

Attached to the top housing wall 14 and spaced therefrom by insulator beads is a rectangular heat reflecting shield 46. The metal shield 46 extends over substantially the entire top wall 14 and is inclined upwards from the front to the rear thereof.

The outer enclosure 10 includes a U-shaped member 49 forming the top and side walls 50 and 51 thereof. The rear wall 52 is a flat member, and the bottom and front wall panels 54 and 56 are formed by an L-shaped member having flange portions at its ends for attachment. The front wall panel 56 is positioned within the top and side wall member 50 so that the edge 57 of the latter overhangs to form a recessed frame about the front panel 56.

The bottom wall 16 of the oven unit 12 is fastened to the bottom panel 54 of the enclosure by means of asbestos spacer members 58 mounted at the corners of the oven unit and at central portions thereof. These asbestos spacers 58 provide an insulation between the enclosure panel 54 and the oven unit panel 16.

An elongated opening 60 is cut in the lower panel 54 and extends substantially the full length of the front of the oven unit 12 and has a width substantially equal to the spacing between the front panel member 56 and the front members 42 and 44 of the oven unit. This elongated opening 60 provides an intake passage for air.

Figure 2:
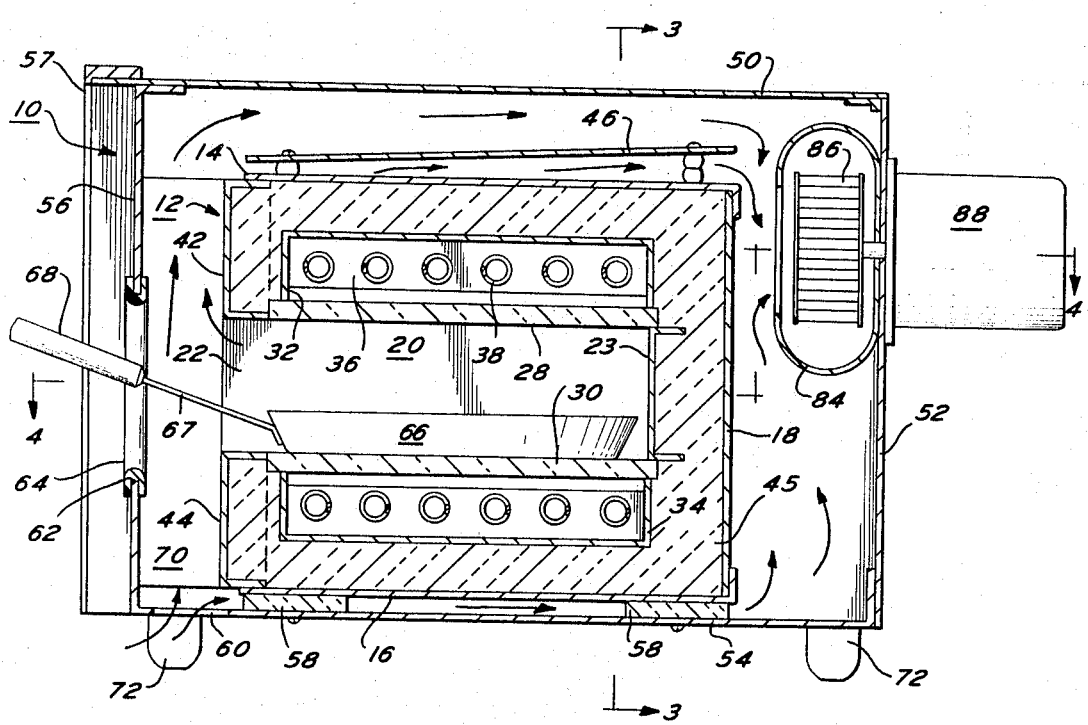
FIG. 2 is a sectional view on the line 2—2 of FIG. 1.
Figure 3:
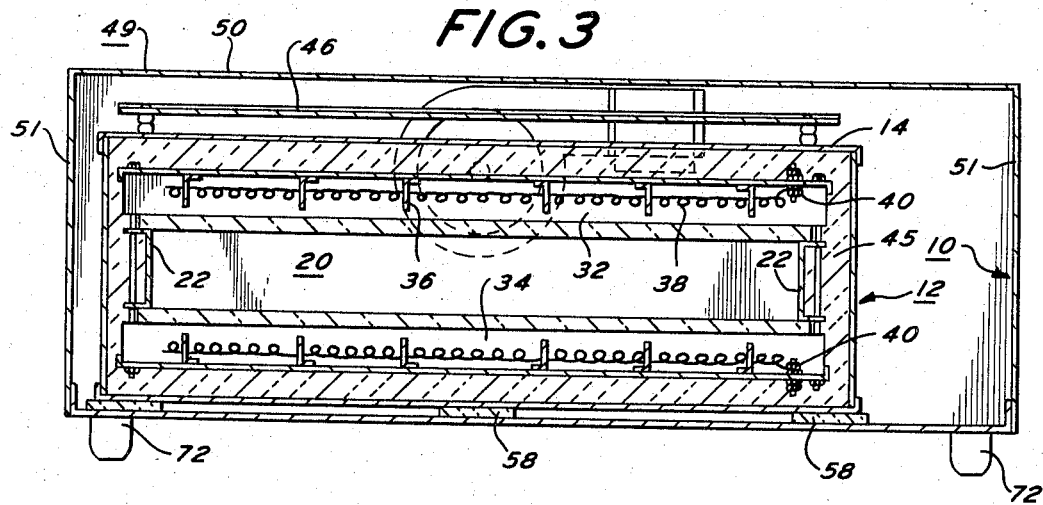
FIG. 3 is a sectional view on the line 3—3 of FIG. 2.
Figure 4:
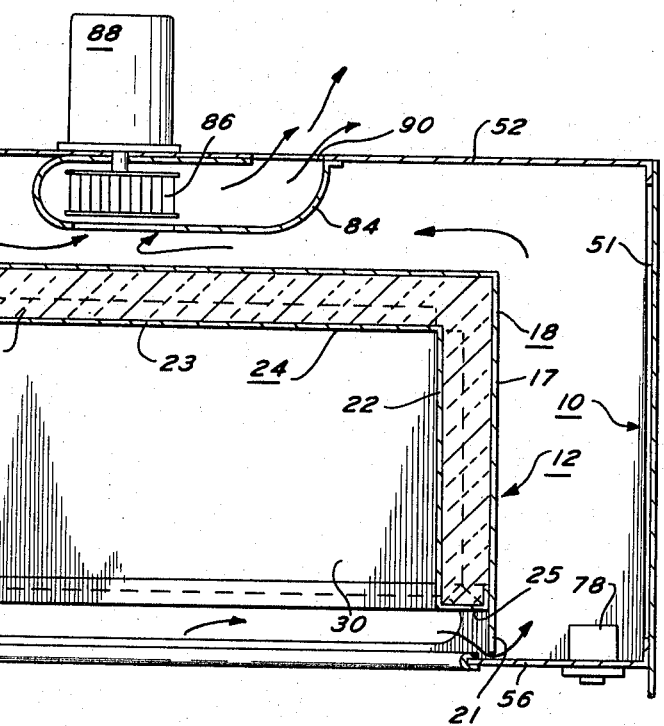
FIG. 4 is a sectional view on the line 4—4 of FIG. 2.

The front panel 56 has an elongated opening 62 cut therein extending substantially the full length of the oven chamber as well as the height thereof corresponding to the space between the members 42 and 44. This opening 62 is covered by a rubber gasket 64, and it serves to provide access to the oven chamber 20. Both the opening 62 and the opening between the front oven members 42 and 44 are left uncovered at all times so that the oven chamber 20 is always fully open and accessible for the insertion of cooking pans 66. A single such pan 66 is shown in FIG. 2 by way of illustration, and the chamber 20 is ordinarily dimensioned to be long enough to receive a plurality of (e.g. four) such pans side by side, and of depth approximately equal to the length of the pan. Rectangular shaped pans are preferred for full utilization of the cooking chamber.

A Bakelite handle 68 for the pan 66 is permanently attached thereto by a long metallic neck and bracket 67, the length of which is approximately equal to the depth of the space 70 between panel 56 and the front of the oven unit 12. The handle 68 grasped by the operator is always far removed from the oven chamber so that it is maintained at room temperature and there is no danger of toxic effects due to heating of the handle material.

All of the materials used in the oven are non-toxic. That is, stainless steel is used for the metal walls of the chamber, the oven housing and the enclosure. All of the walls are attached by welded flanges to avoid any bolts that would give rise to toxic gases under high temperatures.

Rubber corner posts 72 attached to bottom wall 54 are provide for supporting the enclosure 10 on a table or the like. The front panel 56 at one side thereof is used for mounting an on-off switch 74, a power pilot light 76, a timer 78, a thermostat control 80, and a control pilot light 82. The power lines to the terminals 40, the thermostat and other structural elements associated therewith are omitted from the drawing for simplicity of presentation.

Mounted on the rear wall of the enclosure 52 is a fan housing 84 which encloses a squirrel-cage exhaust fan or blower 86 which is powered by a motor 88 that is also mounted on the rear wall panel 52. An opening in the rear wall 52 mates with a similar opening in the housing 84 and serves as an exhaust passageway from the enclosure 10; i.e. air moving through the enclosure 10 enters an opening in the housing 84 and passes through the fan 86 and out through the exhaust passage 90.

The spacing between the oven unit walls and the enclosure walls function as air ducts for the distribution of air around the oven unit that cools it and that functions as an air curtain in place of a door on the oven chamber 20. That is, air coming in the intake passage 60 is drawn up through the passage 70 between the oven unit 12 and the front panel 56 to carry away all heat and vapors from the oven chamber past the gasket covered opening 62. Thereby, it has been found that the oven is extremely convenient and safe to use without an oven door, and at the same time, the rising air current past the access passage to the oven chamber prevents the hot air from passing through the access passage 62. The hot air carried by the air current past the front of the oven unit passes over the top of that unit and largely over the heat reflecting shield 46 and through the fan 86 out through the rear passage 90. Some of the air also passes underneath the heat reflecting shield 46 to remove any high temperature air captured thereunder. The tilting of the polished metal shield 46 ensures that air does not remain trapped thereunder but tends to pass out to the rear.

Air at room temperature passing through intake passage 60 also passes through a duct formed by the spacing under the oven unit and into a duct at the rear thereof and is exhausted through the fan. The intake air also passes around the front edges 21 of the housing wall member 18 which makes a relatively loose fit against the front panel 56. This air movement passes around the sides of the wall unit 12 and carries away any hot air accumulating therein.

The air passages are so dimensioned that a single fan is effective to maintain the walls of the air duct enclosure 10 at a moderate temperature so that it is never dangerous to the operator of the oven. That is, relatively large passages are provided for the air curtain space 70 and the hot space above the oven unit. The small passage below the oven unit and the constricted passages around the edges 21 of the housing are ample for carrying away the smaller amount of heat that radiates from the oven through its sides and base.

The infrared oven of this invention may be used in restaurants or in lunchrooms in which the oven is located in the area occupied by the customers. The heat from the oven chamber 20, it has been found, is effectively directed away from the front access passage 62 as are any vapors due to cooking foods within the chamber. If desired, a suitable venting system may be connected from the exhaust passage to remove hot air from the cooking area. It has also been found that the oven of this invention without a door to enclose the heating chamber is more effective in ensuring that the heating and cooking process is due to the infrared rays rather than due to other heating rays that apparently would be trapped within the chamber. As a result, it has been found that scorching of the food which might otherwise occur is avoided.

This invention has also been found useful as a broiler. For this purpose a single quartz plate heating the food from above is provided in the manner described. The quartz plate forming the bottom wall of the heating chamber is replaced by a stainless steel plate. In addition, a drip pan is provided that rests on the bottom wall, and a grate for supporting the food is slidably mounted on the side walls of the chamber in a conventional manner. In other respects it has been found that the broiler may be constructed without a door in a manner similar to that described above with similar effective results.

Thus, this invention provides a new and improved infrared oven that is efficiently compact and economical in construction. The oven is extremely convenient to use since doors do not have to be opened and closed. Moreover, its outer surfaces are maintained at moderate temperatures so that it is safe and comfortable to use.

What is claimed is:

1. A doorless oven comprising an air duct enclosure having at least a front and top wall and an oven unit housing having a plurality of sides including front and top sides; means to mount said oven unit housing within said enclosure having at least its front and top sides confronting and spaced from the front and top walls, respectively, of said enclosure to form first and second communicating air ducts, respectively, therebetween, said oven unit housing containing a heating chamber, heating means, and an oven access passage in the front side thereof to permit the entrance of objects to be heated therein, said enclosure having a doorless access passage in the front wall thereof confronting said oven access passage to permit the entrance of objects from the exterior of said enclosure, through said first air duct to the heating chamber without the opening and closing of a door; a first air passage located in an enclosure wall below said doorless access opening communicating between the exterior of said enclosure at a first location and said first air duct for permitting the passage of air between the exterior of the housing and the first air duct; a second air passage located in an enclosure wall and remote from said front wall of said enclosure communicating with said second air duct and with the exterior of said enclosure at a second location for permitting the passage of air between said second air duct and the exterior of said housing; and blower means for moving a stream of air in a path comprising one location exterior of said enclosure, said first air passage, said first air duct, said second air duct and said second air passage whereby a curtain of air is formed at the doorless access opening to prevent the escape therethrough of hot vapors and at least the front and top walls of said enclosure are cooled by the continuous removal of the hot gases therebetween.

2. An oven comprising: an oven unit housing having insulated walls on all sides with a heating chamber including heating means therein and an open access passage through a front wall of said housing to permit the entrance of food to the heating chamber; an air duct enclosure having walls enclosing said housing on all sides including a top enclosure wall, front enclosure wall, rear enclosure wall, bottom enclosure wall and a first and second side enclosure wall, means supporting said oven unit within said enclosure having said insulated walls of said oven unit spaced from siad walls of said enclosure to form communicating air ducts therebetween, a doorless access passage in said front wall of said enclosure confronting said open access passage for permitting the entrance of food from the enclosure exterior through an air duct to the oven chamber without opening or closing a door, an air exhaust passage in a rear wall of said enclosure communicating with said air ducts and opening to the exterior of said enclosure to permit the exit of air to the exterior, an elongated air intake passage located in the bottom wall of said enclosure proximate the front wall and opening both to the exterior of the housing and to the space between the said front wall of said housing and said enclosure, respectively, for permitting the entrance of air from the exterior of said housing, the spacing between the respective top walls of said housing and enclosure being of greater distance than the spacing between the respective bottom walls of said housing and enclosure, air restriction means for retricting the movement of air between the respective side walls of said housing and enclosure, and blower means for moving a plurality of streams of air from the exterior of the enclosure through said air intake opening through the formed spaces and out said air exhaust opening to the exterior of said enclosure, including at least one stream past the respective access passages in the space between the respective front walls of the housing and enclosure and thence through the space between the respective top walls of said housing and enclosure whereby a curtain of air is formed at the doorless access opening to prevent the escape therethrough of hot vapors and at least the front and top walls of said enclosure are cooled by the continuous removal of the hot gases therebetween.

3. The invention as defined in claim 2, wherein said heating means comprises an infrared heating means, which includes an electrical heater and at least one quartz plate, said electrical heater being mounted in said oven unit housing above said heating chamber and said quartz plate being mounted therein to form a top wall of said heating chamber and wherein each of the said walls of said air duct enclosure and the sides of said oven unit housing comprise sheet metal.

4. The invention as defined in claim 3, further comprising a flat heat reflecting shield mounted within said air duct enclosure on top of said oven unit housing and inclined to the top side thereof, wherein said infrared heating means further includes a second electrical heater and a second quartz plate, said second electrical heater being mounted in said oven unit housing below said heating chamber and said second quartz plate being mounted therein to form a bottom wall of said heating chamber.

5. In combination, an infrared oven and a plurality of cooking pans; said oven comprising an oven unit and an air duct enclosure therefor; said oven unit including a housing having insulated walls on all sides with a heating chamber including infrared heating means formed therein and with an open access passage extending into said chamber through one wall of said housing; said enclosure having walls enclosing said housing on all sides thereof and spaced from said housing walls to form air ducts, an open access passage in one of said enclosure walls opposite said housing passage and of substantially similar size, an air exhaust passage in another wall of said enclosure, and an air intake passage located below said access passage in a wall of said enclosure and located to supply air to the space between said one enclosure and one housing walls; the length of the pans of said cooking pans and depth of said chamber being substantially the same, the width of said pans and length of said chamber being such that said chamber accommodates a plurality thereof, said cooking pans including handles each having a non-metallic hand portion and a metallic neck fastened between said hand portion and pan and of length approximately equal to the space between said one enclosure and one housing walls.

6. An oven comprising: an oven unit housing having insulated walls on all sides with a heating chamber including heating means therein and an open access passage through a front wall of said housing to permit the entrance of food to the heating chamber; an air duct enclosure having walls enclosing said housing on all sides including a top enclosure wall, front enclosure wall, rear enclosure wall, bottom enclosure wall and a first and second side enclosure wall, means supporting said oven unit within said enclosure having said insulated walls of said oven unit spaced from said walls of said enclosure to form communicating air ducts therebetween, a doorless access passage in said front wall of said enclosure confronting the open access passage for permitting the entrance of food from the enclosure exterior through an air duct to the oven chamber without opening or closing of a door, an air exhaust passage in said rear wall of said enclosure communicating with said air ducts and opening to the exterior of said enclosure to permit the exit of air to the exterior, an air intake passage located in said bottom wall of said enclosure proximate the front wall and opening both to the exterior of the housing and to the space between the said front walls of said housing and said enclosure, respectively, for permitting the entrance of air from the exterior of said housing, and blower means for moving a plurality of streams of air from the exterior of the enclosure through said air intake opening through the formed spaces and out said air exhaust opening to the exterior of said enclosure, including at least one stream past the respective access passages in the space between the respective front walls of the housing and enclosure and thence through the space between the respective top walls of said housing and enclosure whereby a curtain of air is formed at the doorless access opening to prevent the escape therethrough of hot vapors and at least the front and top walls of said enclosure are cooled by the continuous removal of the hot gases therebetween.

7. A doorless oven comprising an air duct enclosure having at least a front wall, top wall, rear wall and a bottom wall and an oven unit housing having a plurality of sides including front and top sides; means to mount said oven unit housing within said air duct enclosure having at least its front and top sides confronting and spaced from the front and top walls, respectively, of said enclosure to form first and second communicating air ducts, respectively, therebetween, said oven unit housing containing a heating chamber, heating means, and an oven access passage in said front side thereof to permit the entrance of objects to be heated therein, said enclosure having a doorless access passage in the front wall thereof confronting said oven access passage to permit the entrance of objects from the exterior of said enclosure through said first air duct to the heating chamber without the opening and closing of a door; an air intake passage located in said bottom wall communicating between the exterior of said enclosure at a first location and said first air duct for permitting the passage of air between the exterior of the housing and said first air duct; an air exhaust passage located in said rear wall of said enclosure communicating between said second air duct and the exterior of said enclosure at a second location for permitting the passage of air between said second air duct and the exterior of said enclosure; and blower means for moving a stream of air from said first location exterior of said enclosure, through said air intake passage, through said first air duct past said confronting doorless access passage and oven access passage, through said second air duct and through said air exhaust passage to said second location exterior of said enclosure, whereby a curtain of air is formed at the doorless access opening to prevent the escape therethrough of hot vapors and at least the front and top walls of said enclosure are cooled by the continuous removal of the hot gases therebetween.

8. The invention as defined in claim 7, wherein said heating means comprises an infrared heating means.

9. The invention as set forth in claim 8, wherein said infrared heating means includes an electrical heater and at least one quartz plate, said electrical heater being mounted in said oven unit housing above said heating chamber and said quartz plate being mounted therein to form a top wall of said heating chamber, and wherein each of the said walls of said air duct enclosure and the sides of said oven unit housing comprise sheet metal, and further comprising a flat heat reflecting shield mounted within said second air duct enclosure on top of said oven unit housing and inclined to the top side thereof, and a layer of insulating material included in the sides of said oven unit housing.

10. The invention as defined in claim 9, wherein said infrared heating means further includes a second electrical heater and a second quartz plate, said second electrical heater being mounted in said oven unit housing below said heating chamber and said second quartz plate being mounted therein to form a bottom wall of said heating chamber and wherein said oven unit housing contains a bottom side spaced from said bottom wall of said enclosure to form a third air duct, said wall and side being spaced apart by a smaller amount than said top side and top wall and said third air duct communicating with said air intake and exhaust passages for additionally moving a stream of air therethrough.

11. A doorless oven comprising an air duct enclosure having at least a front wall, top wall and a bottom wall and an oven unit housing having a plurality of sides including front and top sides; means to mount said oven unit housing within said air duct enclosure having at least its front and top sides confronting and spaced from the front and top walls, respectively, of said enclosure to form first and second communicating air ducts, respectively, therebetween, said oven unit housing containing a heating chamber, heating means, and an oven access passage in said front side thereof to permit the entrance of objects to be heated therein, said enclosure having a doorless access passage in the front wall thereof confronting said oven opening to permit the entrance of objects from the exterior of said enclosure through said first air duct to the heating chamber without the opening and closing of a door; an air intake passage located in said bottom wall communicating between the exterior of said enclosure at a first location and said first air duct for permitting the passage of air between the exterior of the housing and said first air duct; an air exhaust passage located in an enclosure wall and remote from said front wall of said enclosure communicating between said second air duct and the exterior of said enclosure at a second location for permitting the passage of air between said second air duct and the exterior of said enclosure; and blower means for moving a stream of air in a path comprising said first location exterior of said enclosure, said air intake passage, said first air duct past said confronting doorless access passage and oven access passage, said second air duct, and said air exhaust passage to said second location exterior of said enclosure, whereby a curtain of air is formed at the doorless access opening to prevent the escape therethrough of hot vapors and at least the front wall of said enclosure is cooled by the continuous removal of hot vapors.

References Cited by the Examiner
UNITED STATES PATENTS

| | | | |
|---|---|---|---|
| 1,752,433 | 4/1930 | Hortvet | 263—7 |
| 2,167,047 | 7/1939 | Jackson et al. | 107—65 |
| 2,214,630 | 9/1940 | Wheeler | 126—21 X |
| 2,571,218 | 10/1951 | Buttero | 126—19 X |
| 2,839,044 | 6/1958 | Phares | 126—19 X |
| 2,949,524 | 8/1960 | Scarioni | 219—395 |
| 3,059,087 | 10/1962 | Perlman | 219—399 X |
| 3,142,748 | 7/1964 | Warren | 219—400 X |
| 3,155,814 | 11/1964 | Appleman et al. | 126—273 X |
| 3,246,690 | 4/1966 | Fry | 99—340 X |

RICHARD M. WOOD, *Primary Examiner.*

C. L. ALBRITTON, *Assistant Examiner.*